United States Patent [19]
Dybwad et al.

[11] 3,753,472
[45] Aug. 21, 1973

[54] LIGHT PRESSURE OPERATED MICROBALANCE SYSTEM

[75] Inventors: Jens P. Dybwad, Arlington, Mass.; Winser E. Alexander, Alburquerque, N. Mex.; Karl P. Zinnow, Arlington, Mass.

[73] Assignee: The United States of America as represented by the Secretary of the Air Force, Washington, D.C.

[22] Filed: Aug. 12, 1971

[21] Appl. No.: 171,077

[52] U.S. Cl............ 177/210, 177/212, 177/DIG. 6, 73/382
[51] Int. Cl............................ G01g 3/14, G01g 7/00
[58] Field of Search................ 177/210, 212, DIG.6; 73/382

[56] References Cited
UNITED STATES PATENTS
3,211,003  10/1965  Worden ............................... 73/382
3,590,932  7/1971  Dybwad et al...................... 177/210

FOREIGN PATENTS OR APPLICATIONS
969,642  9/1964  Great Britain...................... 177/212
653,519  12/1962  Canada................................ 177/212

Primary Examiner—George H. Miller, Jr.
Attorney—Harry A. Herbert, Jr. et al.

[57]  ABSTRACT

A swinging undamped microbalance that measures time intervals of successive half periods of complete swings using an optical lever consisting of a light source aligned to reflect light from a mirror mounted upon the balance onto a light sensitive detector. The time intervals which are electronically processed determine an off-balance signal that drives a servo which restores the balance by applying light pressure to a mirrored surface of a counter weight. The restoring force is in relation to weight increases of the sample being weighed.

4 Claims, 2 Drawing Figures

LIGHT PRESSURE OPERATED MICROBALANCE SYSTEM

BACKGROUND OF THE INVENTION

This invention relates to microbalances and more particularly to an electronic read out system for undamped swinging balances.

In my copending application, Ser. No. 33,444, now U.S. Pat. No. 3,590,932 entitled "Light Pressure Operated Microbalance," there was described a microbalance which used the pressure of light for counterbalancing small changes in mass. The present invention is an improved balance system employing an electronic read out technique. This invention solves the problem of automatically reading out weight changes on a swinging balance and enhances the accuracy of reading out weight changes by an order of magnitude over balances used in the past which were read out while at rest. The present balance detects weight changes by obtaining readings while it moves at the highest speed as opposed to readings taken when the amplitude is at a maximum and the balance is momentarily at rest.

SUMMARY OF THE INVENTION

The invention is an electronic device which enhances the resolution and accuracy of a balance and is achieved by automatically sensing the null level crossings of an undamped swinging balance and measuring the time intervals between the null crossings. The time intervals of successive half periods are then compared and processed to produce an off-balance signal in relation to the sample weight changes on the balance. The off-balance signal is recorded and further processed to drive a feedback servo loop which then compensates for the weight change and records the force necessary to do so.

It is therefore an object of the invention to provide a novel and improved microbalance.

It is still another object to provide an improved read out system for undamped swinging balances.

It is still another object to provide a microbalance having greater resolution and accuracy by processing time intervals rather than deflection angles to produce an offbalance signal.

It is still another object to provide a microbalance that senses null level crossings of the swinging balance when the motion of the balance is the greatest rather than amplitude maximum where the motion is momentarily halted.

These and other advantages, features and objects of the invention will become more apparent from the following description taken in connection with the illustrative embodiment in the accompanying drawings wherein like reference characters refer to the same or similar elements throughout the several drawings.

DETAILED DESCRIPTION OF THE PREFERRED EMBODIMENT

Figure 1:
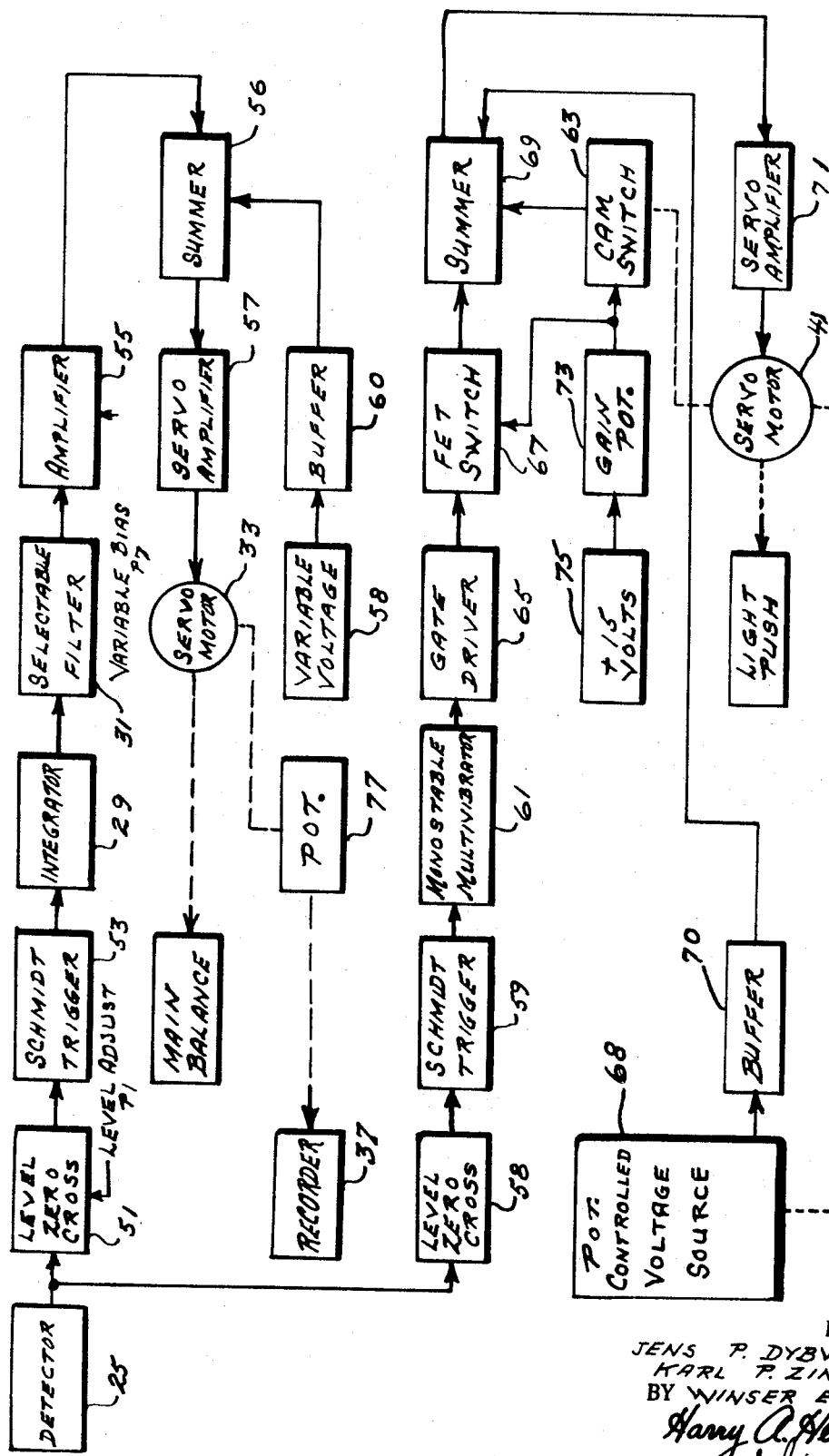
FIG. 1 is a schematic diagram of an embodiment of the invention showing in particular the control and read out system.

Referring to FIG. 1 which shows a schematic diagram of an embodiment of the invention, balance 11 including beam 13 is adapted to swing about fulcrum 15. Suspended from one terminal of the beam is sample 17 and from the other terminal is suspended counterweight 19 on which the under surface is a mirror. The sample could be a silicate bombarded with protons and as a result the sample would have a very slight weight increase which it is desired to measure. Mounted on balance 11 is mirror 21 which has a reflector for an optical level which detects the time intervals of half periods of the swinging balance. Mirror 21 is aligned to reflect light from light source 23 onto light sensitive detector 25 when the balance is in the null or horizontal position, the position when the swinging balance has the greatest motion and consequently the greatest resolution and accuracy.

The symmetry of the period of swinging balance 13 is an indication of the state of balance. If the null indicator or optical lever remains on one side of the null for a longer time interval than it remains on the other, then there is more force acting on that side. A compensating force is then applied to the other side to restore balance. The amount of compensation required to restore balance is a measure of the initial unbalance. This principle of measuring time intervals rather than deflections makes it possible to apply the advantages of a dynamic balance to an automatic balance system.

The null indication system includes a laser beam from laser 23 reflected from a mirror 21 attached to the balance. The reflected beam falls onto a detector 25 which can be a cadmium sulphide photocell. The cell is masked to give two regions of sensitivity. As the balance 11 swings, the laser beam goes from a less sensitive area to a more sensitive area; the transition occurring at null. The photocell is connected to an appropriate circuit such that an electrical signal is generated which indicates the relative position of the balance with respect to null.

An amplifier (not shown) is used to amplify the voltage drop across the photocell and voltage comparator 27 is set to establish the null position. The output of the voltage comparator 27 is then, as an example, V1 when the null indicator would be to the left of null and V2 when the null indicator would be to the right of null. At balance the average output is one half the sum of the two levels $(V1 + V2)/2$. The average value of the output of voltage comparator 27 is a measure of the state of balance. The average output is always $$Vavg = (T1 \times V1 + T2 \times V2)/(T1 + T2)$$

where T1 is the total time that V1 occurs during the period of observation and T2 is the total time that V2 occurs during the observation period. The observation period must be a whole number multiple of the cycle time for the balance or it must be much longer than the cycle time for the balance in order for fractional cycles to become insignificant compared to the whole cycles.

Integrator 29 followed by low pass filter 31 is used to obtain the average of the output of voltage comparator 27. The difference between the average obtained and the average value for the on-balance condition is used as an error signal for servo system 33 which restores balance by providing an appropriate force. Servo 33 can consist of a motor that controls the intensity of light from light source 34 which is directed to mirror 35 and is then reflected upon counterweight 19. The pressure from light source 33 as a restoring force places the balance in equilibrium. The position of servo 33 can be recorded in recorder 37 and calibrated to be a measure of the unbalance force acting on balance 11. For extreme accuracy a residual signal in integrator circuit 29 can be recorded to correct the measured result for inaccuracies introduced by friction in the mechanics of the servo system.

The effect of slight deviations in amplitude of balance 11 is eliminated within integrator 29 and filter circuit 31. Balance damping, however, has to be overcome by periodic pushes which is accomplished by an additional circuit. As balance 11 crosses the null position, the null indicator system is used to initiate a signal that generates a small timed pulse, by trigger 39, in the compensating force. This pulse adds energy to balance 11 equal to its friction loss by its action on servo motor 41 that controls the light pressure from light source 34.

Figure 2:
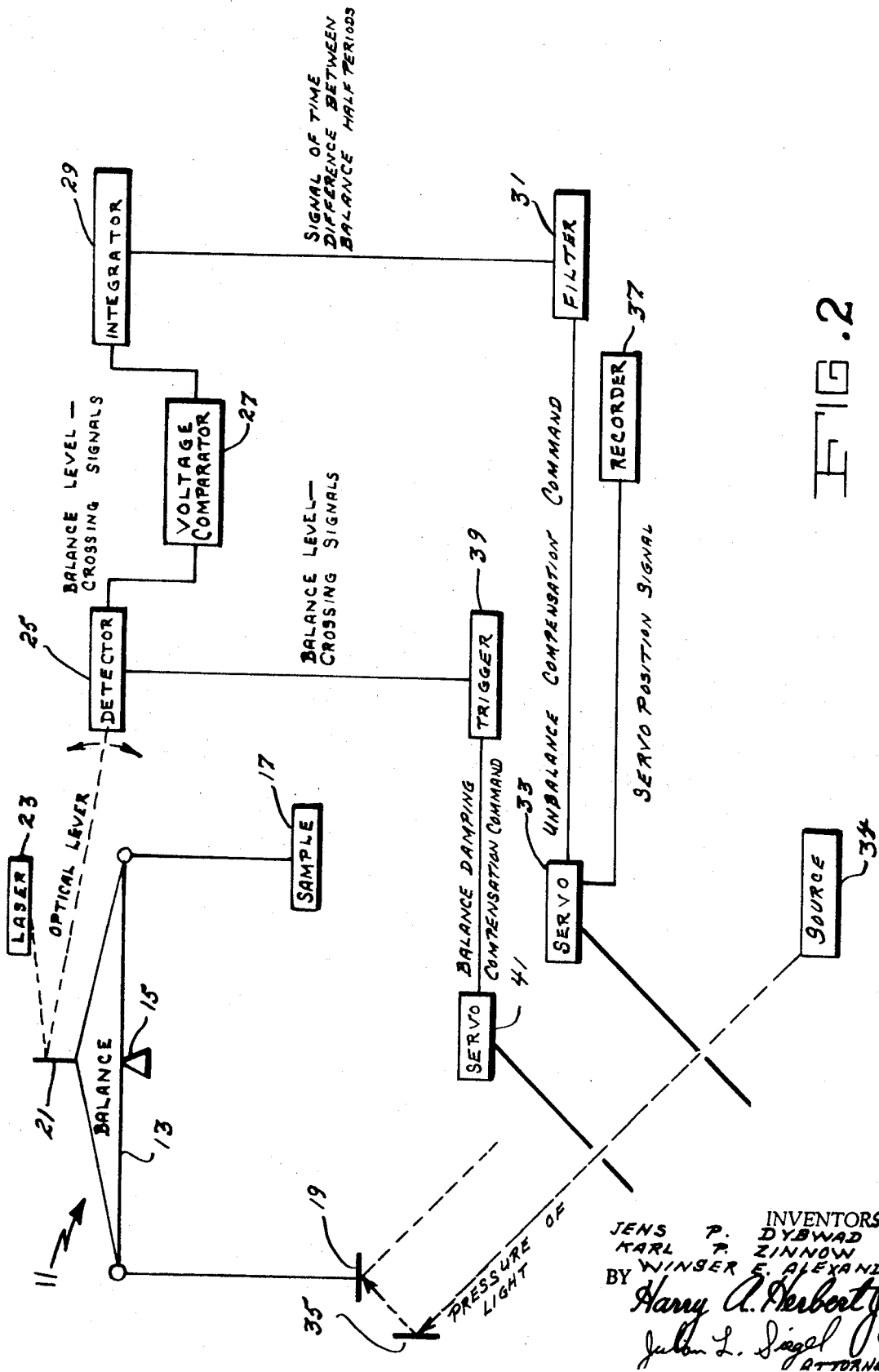
FIG. 2 is a block diagram for the electronic system of the invention.

Referring to FIG. 2 which shows the electronic system, detector 25 is connected into a circuit such that an electrical signal is generated which indicates the relative position of the balance with respect to the null. A voltage comparator comprising level zero crossing circuit 51 with a level adjustment potentiometer and Schmidt trigger 53 is set to determine the null position. The output is a square wave when the balance is in the on-balance state and is assymetrical when the balance is in the off-balance state. The wave is integrated in integrator 29 and fed to filter 31 to produce an error signal which is then amplified by amplifier 55 and used to drive servo motor 33 through summer 56 and servo amplifier 57. Variable voltage source 58 feeds summer 56 through buffer 60.

The signal from detector 25 is also used to provide a light push for each swing of the balance. A rectangular wave is produced in level zero crossing circuit 58 and Schmidt trigger 59 in the same manner as previously mentioned. This wave is used to drive monostable multivibrator 61, the output occurring when the rectangular wave goes positive which is determined by the nature of masking of detector 25. The pulse duration for monostable multivibrator 61 is set to provide enough time for servo motor 41 to move at least enough to activate cam switch 63 coupled to the motor shaft. The pulse from multivibrator 61 through gate driver 65 activates field effect transistor switch 67 which allows power to be supplied to servo motor 41 through summer 69 and servo amplifier 71. Potentiometer controlled voltage source 68 through buffer 70 feeds summer 69. The magnitude of the voltage input to servo amplifier 71 is determined by gain potentiometer 73 fed by power source 75. As servo motor 41 begins to move, cam switch 63 connected in parallel with field effect transistor switch 67 which is activated. This allows power to be supplied to servo motor 41 for one complete rotation. The slowest rotation speed for this motor is determined by the pulse duration of monostable multivibrator 61. It must last long enough for cam switch 63 to be activated.

Outputs are taken from servo motor potentiometer 77 which gives accurate indications of motor positions. These outputs are buffered and attenuated for recording in recorder 37.

What is claimed is:
1. A balance system for detecting sample weight changes comprising:
   a. a swinging beam including a sample attached to one extreme thereof and a mirrored surface counter weight attached to the opposite extreme;
   b. means for sensing the null level crossings of the swinging beam including,
      1. a first source of light;
      2. a light sensitive detector;
      3. a mirror mounted on the swinging beam and aligned to reflect light from the first light source to the light sensitive detector when the swinging beam is in the null level position;
   c. means for measuring the time intervals between the null level crossings with the measuring means fed by the sensing means, a time interval difference between successive half periods being indicative of an off-balance state and the measuring means including,
      1. a first zero crossing detector fed by the light sensitive detector;
      2. a Schmidt trigger fed by the zero crossing detector;
      3. an integrating circuit fed by the Schmidt trigger;
      4. a filter fed by the integrating circuit; and
      5. a recorder fed by the filter;
   d. means for applying a restoring force, including a second source of light directed at the mirrored surface counter weight as controlled by the time interval measuring means, to the counter weight to place the swinging balance in an on-balance state; and
   e. means for measuring the restoring force, the output thereof being indicative of sample weight changes.

2. A balance system for detecting sample weight changes according to claim 1 which further comprises means for applying a light push to the mirrored surface of the counter weight to maintain the motion of the swinging beam.

3. A balance system for detecting sample weight changes according to claim 1 wherein the means for applying a light push comprises:
   a. a second level zero crossing detector fed by the light sensitive detector;
   b. a second Schmidt trigger fed by the second level zero crossing detector;
   c. a monostable multivibrator fed by the second Schmidt trigger;
   d. a field effect transistor switch fed by the monostable multivibrator;
   e. a potentiometer controlled voltage source feeding the field effect transistor switch for controlling the output magnitude thereof;
   f. a motor having a shaft controlling the light push; and
   g. a cam switch connected to the shaft of the motor for regulating power from the field effect transistor switch to the motor.

4. A balance system for detecting sample weight changes according to claim 3 wherein the second light source is a laser beam.

* * * * *